United States Patent [19]

Martin

[11] 3,896,380

[45] July 22, 1975

[54] RADIATING LINE TRANSMISSION SYSTEM

[75] Inventor: David James Reginald Martin, London, England

[73] Assignee: Coal Industry (Patents) Ltd., London, England

[22] Filed: May 11, 1973

[21] Appl. No.: 359,341

[30] Foreign Application Priority Data

May 26, 1972 United Kingdom .............. 24967/72

[52] U.S. Cl. .............................................. 325/28

[51] Int. Cl. .............................................. H04b 3/00

[58] Field of Search ............ 325/22, 23, 26, 51, 28, 325/53, 54, 178, 179, 180; 333/84 R, 26, 95 S, 82 B, 97 R, 4, 5; 179/82; 340/22, 32, 33

[56] References Cited

UNITED STATES PATENTS

| | | | |
|---|---|---|---|
| 3,348,160 | 10/1967 | Lee et al. | 325/180 |
| 3,585,505 | 6/1971 | Ogilvy | 325/51 |
| 3,609,247 | 9/1971 | Halstead | 325/51 |
| 3,673,497 | 6/1972 | Thrasher | 325/180 |
| 3,781,725 | 12/1973 | Yoshida et al. | 333/84 L |

OTHER PUBLICATIONS

The Radio Amateur's Handbook, 1972 Edition, pp. 561–572.

*Primary Examiner*—Robert L. Griffin
*Assistant Examiner*—Jin F. Ng
*Attorney, Agent, or Firm*—James C. Wray

[57] ABSTRACT

A radiating transmission line system employs a pair of leaky coaxial cables which are spaced from each other and extend along a tunnel to propagate radio signals. The signals to be propagated are fed to both cables in such a manner that the signals in one cable are in anti-phase to the signals in the other cable. This reduces attenuation of the signal in the cable.

5 Claims, 2 Drawing Figures

PATENTED JUL 22 1975 3,896,380

RADIATING LINE TRANSMISSION SYSTEM

This invention relates to radiating transmission line systems, a method of operating such systems and to cable for use in such systems. The invention finds particular, but not exclusive, use and application to communications in tunnels and mines.

One particular problem which arises in transmitting radio signals in tunnels or mines is that the enclosed area of the tunnel or mine limits the degree of propagation of radio waves. In order to overcome this a number of alternative suggestions have been made based on the use of a radiating transmission line which extends along the length of the tunnel or mine and which is fed with a radio frequency signal. This signal radiates from the line which thus acts as a form of aerial and the signal is picked up locally by radio receivers in the mine. The receivers may also incorporate transmitters which can transmit to the line and signals received there are picked up and propagated back along the line to a receiver. Transmission to and from the mobile receivers usually takes place at different frequencies for operational reasons and different mobile receivers/transmitters may operate at different frequencies. Such systems are described, for example, in British Pat. Nos. 1,248,222, 1,248,223 and 1,239,231.

A number of forms of radiating transmission lines have been suggested, among the simplest of which have been coaxial cables having loosely wound braid. An alternative has been a coaxial cable such as is described in British Pat. No. 1,235,888, having a tubular outer conductor which has an open seam or a series of slots or holes through which radio signals can propagate. These cables have been known as 'leaky cables,' 'leaky feeders,' or 'leaky lines.'

When the braid type of conductor has been used the optical cover of the braid has been reduced by up to 50% by omitting certain of the normal braid wires. Depending on the amount of optical cover so omitted the strength of the signal radiated is increased.

However, reducing the braid cover in this way also introduces the disadvantage that the longitudinal attenuation of the signals in the line is increased, and the range of communication thereby decreased, owing to the increased electrical resistance of the braid resulting from the reduction in the number of wires forming it. This loss partially offsets the advantage otherwise gained by reducing the braid cover, and limits the useful degree of reductions in braid cover.

It is commonly accepted that the radiation which takes place from imperfect coaxial cables of this nature is a function of a quantity known as the 'surface transfer impedance' or 'coupling impedance,' a property of the braid itself which can be measured by standard means and which in particular depends on the optical braid cover.

An analysis of the radiation process indicates that the surface transfer impedance is only one of several properties of the cable which influence the radiation. One other significant factor is the attenuation constant of a wave propagated along the outside surface of the outer braid.

In order to improve the radiation it is desirable to keep this attenuation constant as low as possible and it is an object of the invention to provide a radiating transmission line system in which the attenuation constant is reduced from the value hitherto able to be achieved.

According to a first aspect of the present invention a radiating transmission line system includes a pair of coaxial cables, each of the kind comprising an inner core, a surrounding dielectric material and a perforate outer conductor, extending from a source of radiation and parallel with each other for a substantial part of their length, the source of radiation being arranged in use to energize both cables in phase opposition to each other.

According to a second aspect of the invention a method of operating a radiating line transmission system comprised of a source of radiation connected to a pair of coaxial cables, each of the kind comprising an inner core, a surrounding dielectric material and a perforate outer conductor, extending parallel with each other for a substantial part of their length, consists of feeding the signals to be transmitted to one cable on a first phase and to the other cable on a second phase which is in direct antiphase with the said first phase.

The currents induced on the outer surface of the outer conductor of the first cable are then matched by currents similarly induced on the outer surface of the outer conductor of the second coaxial cable, of equal amplitude but opposite in phase. The two outer conductors of the two cables thus act as a balanced two-wire transmission line. The attenuation constant of the composite line is thus considerably lower than that of each of the two cables forming the line if considered separately with no accompanying cable. The desired object of lowering the overall attenuation constant is thus achieved. For a given value of surface current on the outer conductors of the cables the resulting field strength in the vicinity of the line is normally considerably lower for the two outer conductors carrying antiphase currents than it would be for one outer conductor acting by itself, because of the partial mutual cancelling effect. However, the improvement obtained in the values of the induced currents in the two outer conductors considerably outweighs this disadvantage and results in a greatly enhanced field strength.

The two cables may be joined at their ends remote from the transmission source by a terminating impedance having a characteristic impedance related to the impedance of the circuit of which the cables form part and to the nature of the signals being transmitted.

The source of radiation may include a receiver to receive signals transmitted by local transmitters/receivers situated along the line and being picked up by the line.

The signals in the two coaxial cables may be caused to be in antiphase by feeding the cables from a phase splitting or balun transformer. Alternatively, one of the cables may include delay means, such as an additional length of cable. This additional length preferably is an odd integral number of half wavelengths of the normal signal for which the system is designed to operate.

According to a third aspect of the invention a cable for use in or with the system and method of the invention comprises two identical coaxial cables each comprising an inner conductor, a surrounding dielectric material and a perforate outer conductor, and spacer means for holding the two coaxial cables parallel along their length.

The spacer means may comprise a series of substantially rigid individual spacer members connected to the coaxial cables at intervals along their length, or, alternatively, the coaxial cables may be moulded into a substantially rigid dielectric material. This dielectric material may also act as a sheath for the coaxial cables.

In order that the invention may be readily understood two examples of radiating transmission line systems for use in a mine tunnel in accordance with the invention and using the method and cable thereof will now be described, by way of example only, with reference to FIGS. 1 and 2 of the accompanying drawings.

In the drawings

Figure 1:
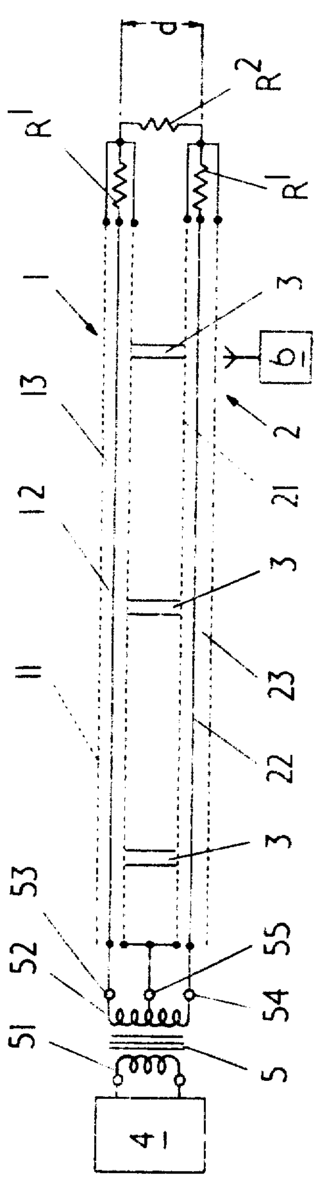
FIG. 1 is a schematic view of the first system.

Referring first to FIG. 1, the two similar coaxial cables 1,2 each of the type having respectively a loose wire braid 'leaky' outer conductor 11,21, an inner core 12,22 and a dielectric 13,23 surrounding the core, are arranged parallel in a tunnel and spaced a distance d apart by dielectric spacers such as 3; this distance may be varied to suit the particular conditions but is preferably a small fraction of the wavelength of the radio wave being propagated; for example, in the case of an 80 MHz radio wave the spacing d might be from 2 to 20 cm. Each cable 1,2 is terminated separately in its characteristic impedance, shown at R1. The balanced two-wire line formed by the two outer conductors is also terminated in its appropriate characteristic impedance shown at R2.

The two cables 1 and 2 are connected to the fixed source radio transmitter/receiver 4 of any suitable design through a phase-splitting or balun transformer 5 having a primary winding 51 and a centre tapped secondary winding 52.

A number of local transmitter/receivers, of which one only is shown at 6, are situated at various points along the mine tunnel and pick up signals radiated from the cables 1,2 and originating from the source 4, and also radiate their own locally generated signals which are picked up by the cables 1,2 and transmitted back to the receiver part of the source 4.

In use when the fixed source 4 is transmitting, its signal is applied first to the primary winding 51 of the transformer 5. As can be seen from FIG. 1 the inner conductors 12,22 of cables 1,2 are connected respectively to opposite ends 53,54 of the secondary winding 52 of this transformer and thus receive the signal to be transmitted on opposite phases. The outer conductors 11,21 of the cables are connected in common to the mid-point 55 of the transformer secondary winding 52. The signals in the inner conductors 12,22 are propagated with low loss along the cables 1 and 2 and induce leakage currents on the outer surfaces of the braids 11,21 in the normal manner of leaky cable radiating systems; in the present case, however, these currents act to cancel each other out and thus act to attenuate to a lesser extent than normal the signals propagated from the cores and through the balanced transmission-line action of the two braids. Signals radiated by the transmission-line thus formed are received by the mobile transmitter-receiver 6. In the reciprocal direction, signals radiated by the mobile station 6, when transmitting induce balanced currents in the two braids 12,22 of the cables 1 and 2, in turn are transferred to normal coaxial-mode currents in the cables and propagated with low loss to the fixed source 4 operating in its receiving mode.

Figure 2:
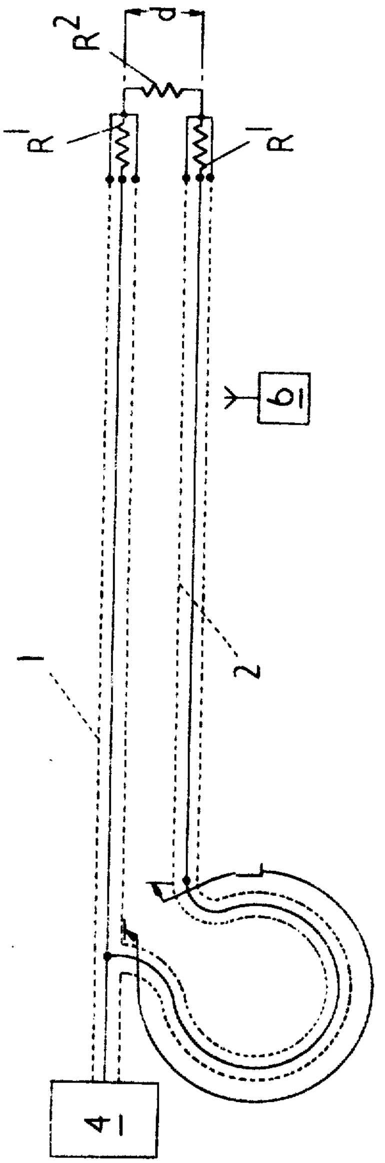
FIG. 2 is a schematic view of the second system. Like parts in the two systems have been given the same references.

In FIG. 2, to which reference is now made, the transformer 5 of the first example is dispensed with and the cable 2 is made longer than cable 1 by a distance L which is so adjusted that the additional delay introduced into this cable causes a phase reversal of the current fed to it by comparison with that fed to cable 1. The additional length L will normally be approximately an odd integral number of half-wavelengths of the signal, the precise length depending on the velocity ratio of the particular coaxial cable used.

The operation of this example is substantially the same as in the previous one; however, this system can only be made correct for one particular frequency, whereas the system shown in FIG. 1 remains correctly adjusted for all frequencies.

The coaxial cables 1 and 2 may be separate cables suitably installed in the necessary fixed relation to one another, for example by using electrically non-conductive spacers which clip or otherwise are attached to the cables. Alternatively, a composite cable may be specially constructed comprising two normal coaxial cables joined together along their length with a fixed spacing between them. The final spacing may be a web of dielectric sheathing material which is used to sheath the cables overall.

Although the principal application of the invention is to a tunnel or mine, it can also be used for surface communication systems, such as along lengths of motorways where local receivers are used by services such as fire and police.

I claim:

1. A radiating transmission line system comprising a source of radiation, a pair of coaxial cables extending from the said source, the cables being parallel to each other along their length, each cable comprising an inner core, a surrounding dielectric material and an apertured continuous outer conductor, and means for applying energy from the source of radiation to both cables whereby the energy in one cable is in phase displacement to the energy in the other cable, wherein the said means for applying energy from the source of radiation to both cables comprises a transformer interposed between the said source of radiation and the pair of coaxial cables, the transformer having an output winding connected to the said cables, the outer conductors of the cables being connected to a common point on the output winding and the inner cores of the cables being connected respectively one to each end of the output winding.

2. A radiating transmission line system according to claim 1, in which the pair of cables are terminated each in its respective terminating impedance.

3. A radiating transmission line system according to claim 1, wherein the outer conductors of the pair of cables are terminated in a common impedance.

4. A radiating transmission line system comprising a source of radiation, a transformer having a primary winding and a center tapped secondary winding, a pair of similar coaxial cables, each cable being comprised of an inner core, a surrounding dielectric material and an apertured continuous outer conductor, spacer means for maintaining the said cables substantially parallel, each inner core terminates in its respective impedance, the outer conductors terminate in a common impedance, and at least one mobile receiver along the pair of coaxial cables for receiving signals propagated from the cables; the inner core of a first of the said coaxial cables being connected to one end of the said transformer secondary winding and the inner core of the other of the said coaxial cables being connected to the other end of the said transformer secondary winding so that in operation signals from the source are transmitted in the first of the coaxial cables in phase opposition to the signals transmitted in the second of the cables.

5. A radiating transmission line system comprising a source of radiation, a pair of coaxial cables extending from the said source, the cables being parallel to each other along their length, each cable comprising an inner core, a surrounding dielectric material and an apertured continuous outer conductor, each inner core terminating in its respective terminating impedance means and the outer conductors terminating in a common impedance, and delay means comprising an additional length of cable having a length which is an odd number of half wavelengths of the frequency of the source of radiation inserted in one of the cables of the said pair of cables, and means applying energy from the source of radiation to both cables whereby the energy in one cable is in phase opposition to the energy in the other cable.

* * * * *